(12) United States Patent
Wright

(10) Patent No.: US 9,726,315 B2
(45) Date of Patent: Aug. 8, 2017

(54) BRANCH PIPE TEE WITH INTEGRAL VOLUME FOR SHORT CARS

(71) Applicant: NEW YORK AIR BRAKE, LLC, Watertown, NY (US)

(72) Inventor: Eric C Wright, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 272 days.

(21) Appl. No.: 14/332,604

(22) Filed: Jul. 16, 2014

(65) Prior Publication Data

US 2016/0018038 A1 Jan. 21, 2016

(51) Int. Cl.
*F16L 41/02* (2006.01)
*B61H 11/00* (2006.01)
*B60T 17/04* (2006.01)

(52) U.S. Cl.
CPC .......... *F16L 41/021* (2013.01); *B60T 17/043* (2013.01); *B61H 11/00* (2013.01)

(58) Field of Classification Search
CPC ..... F16L 41/021; F16L 41/026; B60T 17/043; B60T 17/06
USPC ................................ 285/129.2, 129.1, 130.1
See application file for complete search history.

(56) References Cited

U.S. PATENT DOCUMENTS

| 408,826 | A | * | 8/1889 | Conroy | F16L 41/021 |
| | | | | | 285/130.1 |
| 587,125 | A | * | 7/1897 | Kennedy | F16L 41/021 |
| | | | | | 285/126.1 |
| 1,071,306 | A | * | 8/1913 | Finigan | B01D 35/005 |
| | | | | | 285/129.1 |
| 1,427,107 | A | * | 8/1922 | Kaplan | E03C 1/122 |
| | | | | | 285/129.1 |
| 1,598,083 | A | * | 8/1926 | King | B60T 17/043 |
| | | | | | 137/546 |
| 2,916,310 | A | * | 12/1959 | Manas | E03C 1/122 |
| | | | | | 285/129.1 |
| 3,346,887 | A | * | 10/1967 | Sommer | E03C 1/122 |
| | | | | | 285/129.1 |
| 4,449,741 | A | * | 5/1984 | Litvin | F16L 41/03 |
| | | | | | 285/129.1 |
| 6,260,932 | B1 | * | 7/2001 | Tinklepaugh | B60T 17/043 |
| | | | | | 251/293 |
| 9,057,470 | B1 | * | 6/2015 | Gosse | H02G 3/06 |
| 2007/0131495 | A1 | * | 6/2007 | Matsushita | B60T 7/10 |
| | | | | | 188/24.22 |

FOREIGN PATENT DOCUMENTS

FR EP 2196369 A1 * 6/2010 ............. B60T 17/04

* cited by examiner

*Primary Examiner* — David E Bochna
(74) *Attorney, Agent, or Firm* — Bond Schoeneck and King PLLC; David Nocilly

(57) ABSTRACT

A branch pipe tee for a rail car having a length that is below standard. The branch pipe tee has a standard mount for connecting to the brake pipe and branch pipe as well as integral volume that compensates for the reduced brake pipe length of the rail car. The integral volume is dimensioned to make the effective brake pipe length of rail car fall within standard ranges so that the braking system of the rail car can perform normally and avoid the need for additional equipment to compensate for the length of the rail car.

2 Claims, 3 Drawing Sheets

BRANCH PIPE TEE WITH INTEGRAL VOLUME FOR SHORT CARS

BACKGROUND OF THE INVENTION

1. Field of the Invention

The present invention relates to branch pipes for rail car braking system and, more particularly, to a branch pipe having an integral volume that increases the effective length of the brake pipe of a rail car.

2. Description of the Related Art

The AAR standards define brake performance requirements for standard length cars with a brake pipe length in the range of 45 feet to 75 feet, and long cars with brake pipe length of more than 75 feet to 110 feet. The AAR compliant brake control valves are tuned to provide AAR specified brake performance, including emergency sensitivity, for the brake pipe volume corresponding to these brake pipe lengths.

Iron ore cars, and other cars carrying very heavy loads, are often much shorter than the AAR standard car lengths so that they meet the axle load limits of 31 tons due to the density of the iron ore or other material. For this reason, iron ore cars may have brake pipe lengths shorter than 35 feet. If a standard AAR control valve is applied to a car with this reduced brake pipe volume, emergency sensitivity, quick service, and other control valve functions which are proportional to the brake pipe volume may be adversely impacted. The adverse impacts can include the potential for undesired emergency brake applications, which can have a significant impact on train operations and safety.

Several remedies are well known, but have disadvantages that remain unaddressed in the art. De-tuned control valves, known as SS for "super short" valves, have been offered for short cars. SS valves generally have a desensitized Emergency Portion, but heretofore have not addressed the quick service and other brake pipe volume dependent functions of the Service Portion. Significantly, SS valves are not defined by an AAR standard, and are generally not poke yoked to prevent misapplication of a standard valve. AAR standards require a longer mounting stud on the pipe bracket for "long" valves to prevent misapplication of long/standard valves. Because the SS valve is not made to any AAR standard, this provision is not addressed. As a result, SS valves have generally been applied only to closed, non-interchange railway operations, where there is no opportunity to mix up control equipment on the car during maintenance.

It is also known to address the issue of reduced brake pipe volume on short cars by the addition of a volume or by using larger-diameter, non-AAR standard pipe for the brake pipe. While both solutions provide acceptable technical solutions, they are generally resisted by the car builders, as both require additional engineering and add cost to the car. Both solutions require additional pipe fittings, first to tee off the brake pipe and pipe to a standalone volume, and second for the expansion and reducing of pipe fittings as needed to adapt a larger brake segment to the AAR standard (1¼ IP) pipe fittings.

BRIEF SUMMARY OF THE INVENTION

The present invention comprises the addition of an integral volume to a standard Branch pipe tee fitting. An AAR-standard Branch Pipe Tee fitting is typically used to connect the 1¼" brake pipe that runs the length of the car to the ¾" branch pipe that connects to the brake control valve pipe bracket. The present invention adds an integral volume to the otherwise standard Branch Pipe Tee fitting to provide an additional brake pipe volume that is equivalent to approximately 10 feet of brake pipe, thereby simulating a standard length car. It should be recognized that the Branch Pipe Tee could be made with other volumes as well. The resulting Branch Pipe Tee with Integral Volume according to the present invention provides the same pipe connection locations and interfaces and fixation location and interface as the existing AAR-standard Branch Pipe Tee fitting as well as the integral additional volume. As a result, the present invention compensates for below standard length rail cars but also allows for the use of a standard control valve and eliminates the poke yoke issues so that both the Service and Emergency portions have optimum brake pipe volumes. The present invention also provides a solution that is very easy for a car builder to make and implement as the invention fits and is installed on the car with no engineering modifications or additional labor required. In addition, because a Branch Pipe Tee according to the present invention is attached to the brake pipe and branch pipes by bolted flange connections, it may be easily retrofitted onto existing short cars to address any brake performance issues that may exist.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
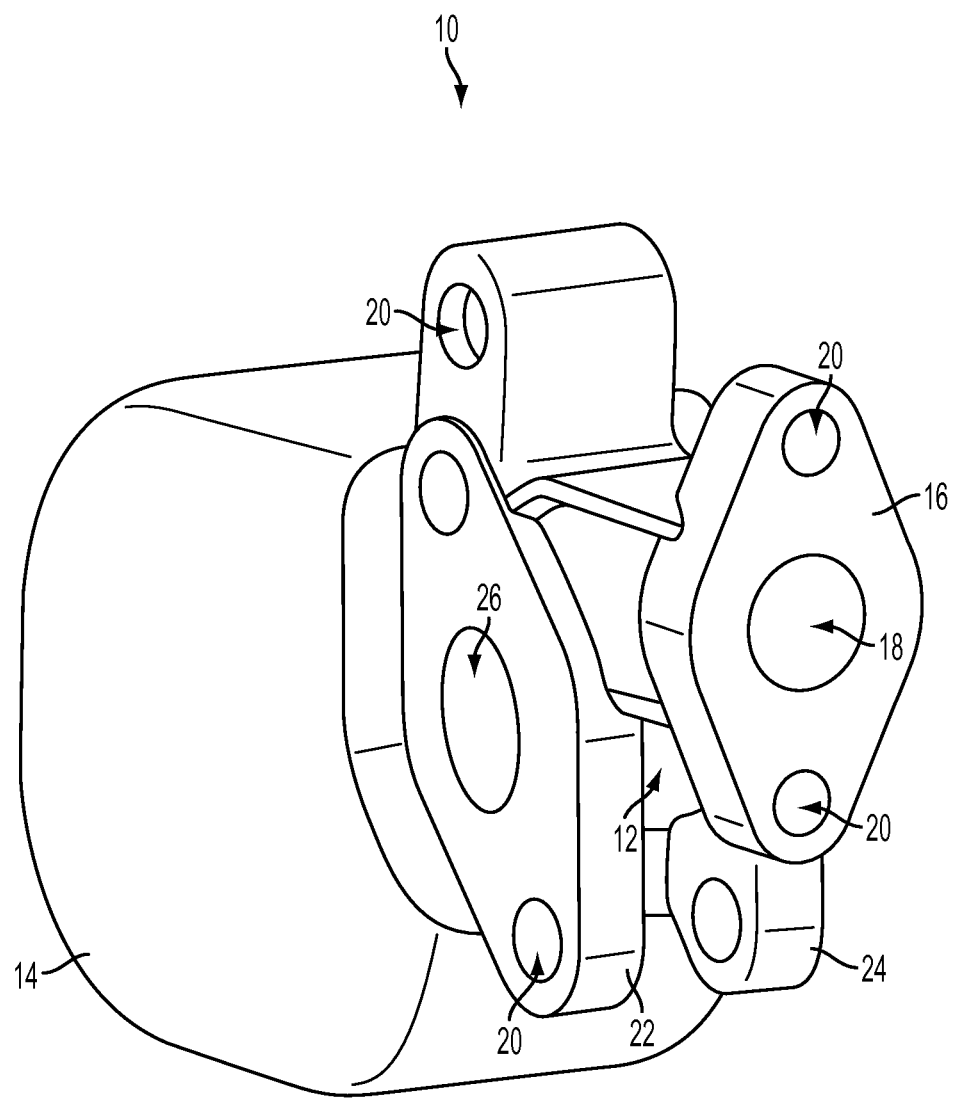
FIG. 1 is a perspective view of a branch pipe tee having an integral volume according to the present invention.
Figure 2:
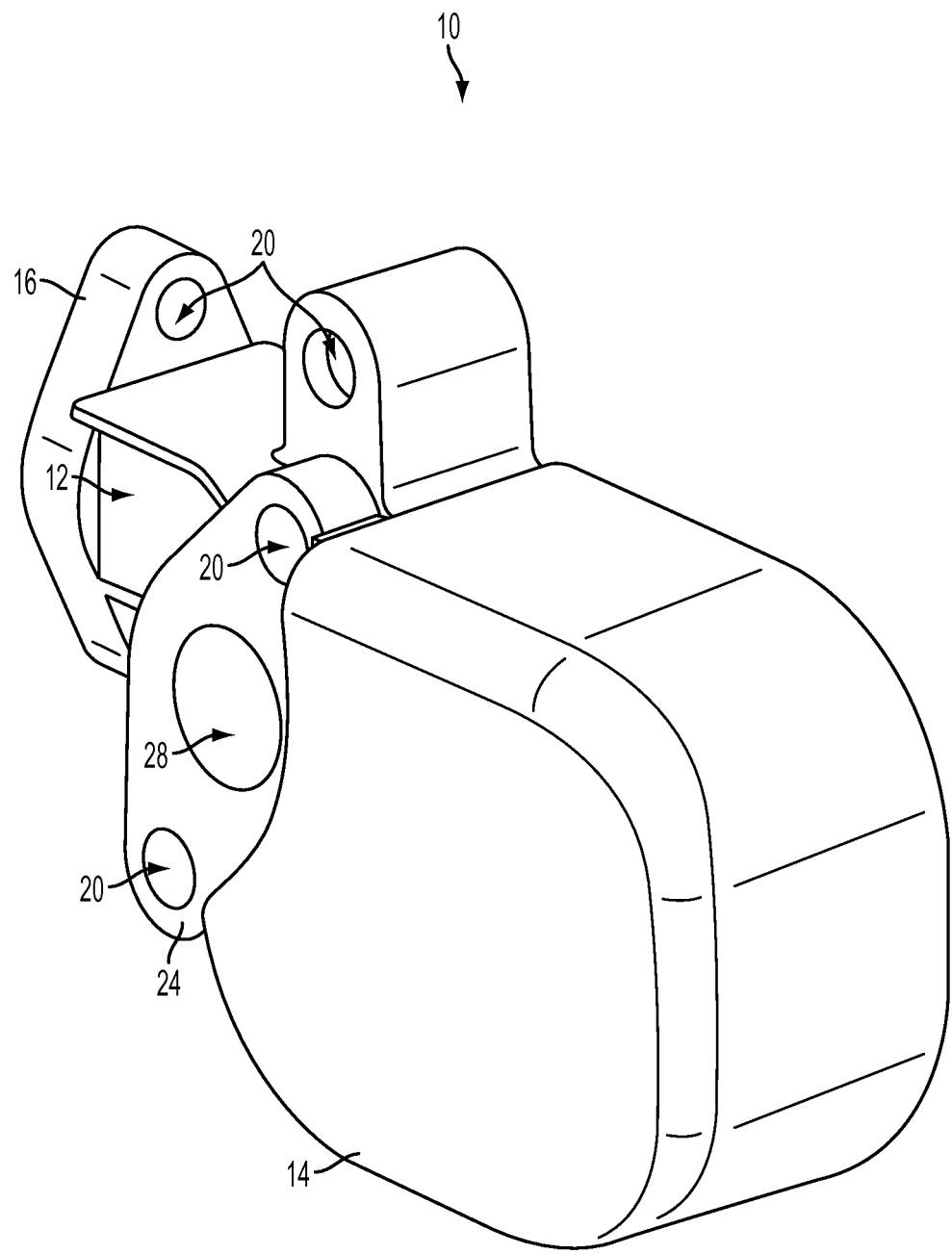
FIG. 2 is a perspective view of a branch pipe tee having an integral volume according to the present invention.

Referring now to the drawings, wherein like reference numerals refer to like parts throughout, there is seen in FIGS. 1 and 2 a branch pipe tee 10 according to the present invention having a standard mount 12 for interconnecting to a train braking system and an integral volume housing 14 in communication with mount 12. Mount 12 comprises a flange 16 having a port 18 formed therethrough and including mounting holes 20 that are dimensioned for interconnection to a standard branch pipe that leads to a brake control valve. Mount 12 further comprises a pair of opposing flanges 22 and 24 having ports 26 and 28 formed therethrough, respectively, along with additional mounting holes 20 for interconnecting branch pipe tee 10 along an intermediate portion of a brake pipe. Branch pipe tee 10 may thus be attached to a brake pipe in the same manner as a convention branch pipe tee.

Figure 3:
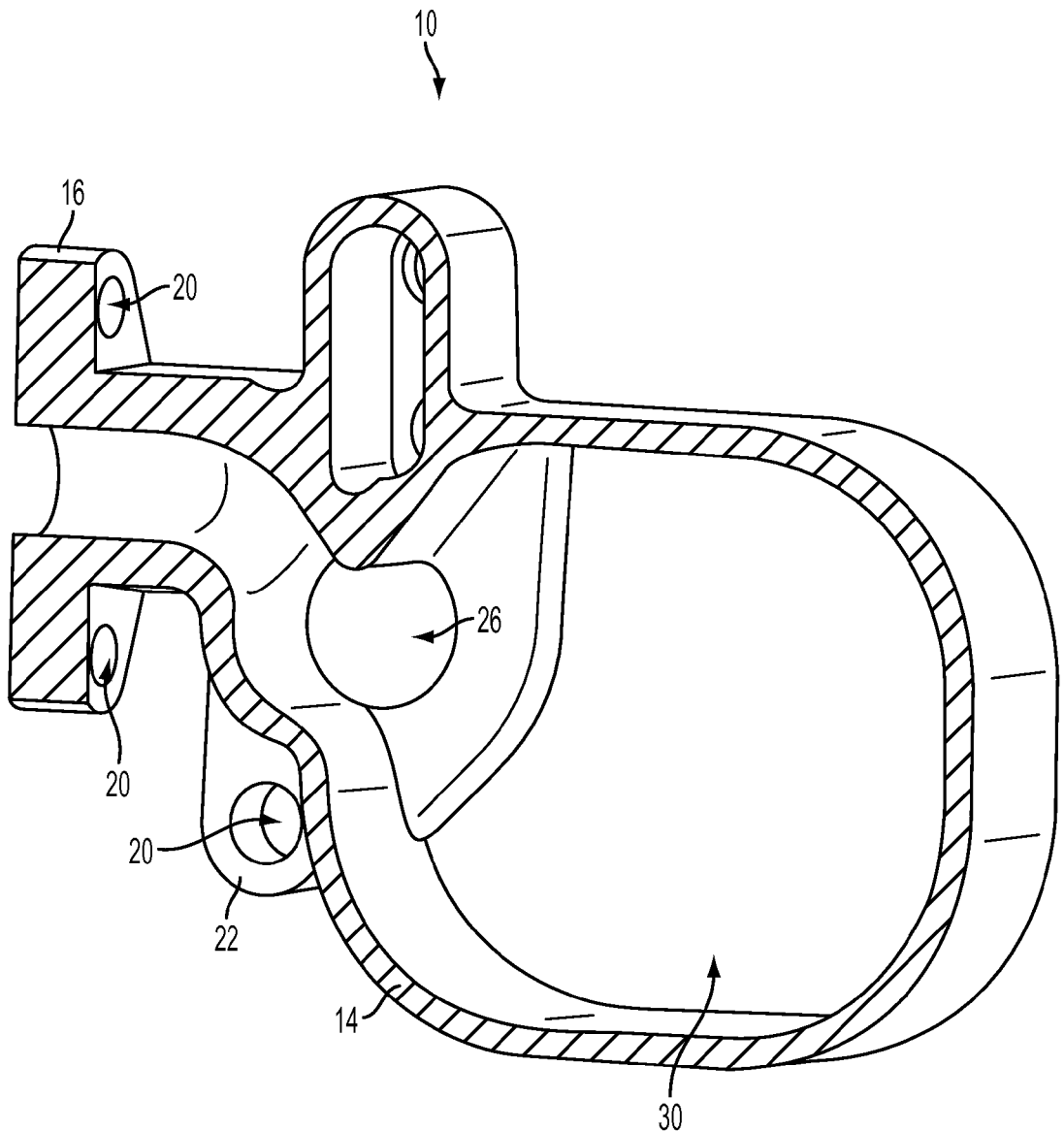
FIG. 3 is a cross-sectional view of a branch pipe tee having an integral volume according to the present invention.

As seen in FIG. 3, pipe 10 provides for fluid communication between ports 18, 26 and 28 as well as with an integral volume 30 formed by integral volume housing 14. Integral volume 30 is dimensioned to compensate for any reduced brake pipe length of a rail car to which branch pipe tee 10 is to be attached. As a rail car carrying a heavy load, such as an iron ore car, may have a brake pipe length that is shorter than the standard 45 to 75 feet, volume 30 may thus be dimensioned to provide the difference in volume between the shorter brake pipe of the heavy rail car and the standard 45 to 75 feet brake pipe to which a braking system is configured. For example, in a rail car having a 35 foot brake pipe, integral volume will compensate for at least 10 feet of brake pipe, thereby bringing the effective length of the brake pipe up to or above the minimum standard length of a regular rail car so that that the heavy rail car can be controlled by conventional equipment and will undergo standard braking performance and operations.

What is claimed is:

1. A branch pipe tee, comprising
   a first port having a 1.25 quarter inch diameter formed in a first flange configured to connect to a first portion a rail car brake pipe and a second port having a 1.25 inch diameter formed in a second flange positioned oppositely from the first flange and configured to connect to a second portion of a rail car brake pipe;
   a third port having a 0.75 inch diameter formed in a third flange that is configured to connect to a branch pipe;
   a housing connecting the first port, the second port, and the third port and additionally defining a predetermined volume that increases the effective length of the connection of the first port, the second port, and the third port by an amount that represents at least ten feet of the rail car brake pipe by being in fluid communication with said first port, said second port, and said third port and the brake pipe and the branch pipe when the brake pipe and the branch pipe are interconnected thereto.

2. The branch pipe tee of claim 1, wherein said housing is dimensioned so that said predetermined volume increases the effective length of the brake pipe to between 45 and 75 feet.

* * * * *

UNITED STATES PATENT AND TRADEMARK OFFICE
CERTIFICATE OF CORRECTION

PATENT NO. : 9,726,315 B2  Page 1 of 1
APPLICATION NO. : 14/332604
DATED : August 8, 2017
INVENTOR(S) : Eric C. Wright It is certified that error appears in the above-identified patent and that said Letters Patent is hereby corrected as shown below:

Column 3, Line 11, beginning with "a first port having" remove the word "quarter" after the word "1.25" and before the word "inch".

Signed and Sealed this
Twenty-second Day of May, 2018

Andrei Iancu
*Director of the United States Patent and Trademark Office*